United States Patent

[11] 3,580,453

[72] Inventor Robert E. Schoeneman
East Setauket, N.Y.
[21] Appl. No. 864,811
[22] Filed Oct. 8, 1969
[45] Patented May 25, 1971
[73] Assignee Potter Instrument Company, Inc.
Plainview, N.Y.

[54] TENSION ARM
1 Claim, 3 Drawing Figs.

[52] U.S. Cl. .......... 226/195, 242/75.3
[51] Int. Cl. .......... B65h 23/10
[50] Field of Search .......... 226/195, 44; 242/75.3

[56] References Cited
UNITED STATES PATENTS
3,130,936 4/1964 Rochman .......... 242/75.3
3,311,280 3/1967 Larson .......... 226/195

*Primary Examiner*—Richard A. Schacher
*Attorney*—Laurence J. Marhoefer

ABSTRACT: An improved magnetic tape transport has a pivoted tension arm to which is attached a constant-tension flexure spring that is attached to the arm and the chassis so that a line through the points of attachment and the tape path are substantially parallel, thus maintaining a constant tape tension for all positions of the arm.

INVENTOR
ROBERT E. SCHOENEMAN
BY

ATTORNEY

TENSION ARM

BACKGROUND OF THE INVENTION

The field of the present invention is magnetic tape transports and more particularly the invention relates to an improved buffer-loop-forming tension arm which maintains constant tape tension.

In a magnetic tape transport a major problem is that of insuring constant tape velocity in the vicinity of the transducing heads in order to assure a faithful signal reproduction. Since the tape is pulled across the head it is important to maintain a constant tape tension.

So called tension arms have been employed for many years to form buffering loops in the tape, allowing rapid acceleration of the tape in the region of the head without the need for accelerating the relatively massive tape reel. Prior art attempts to provide a tension arm that has a constant tension throughout its range of travel have proved relatively expensive and not altogether satisfactory.

SUMMARY OF THE INVENTION

The present invention has as a primary aim to provide a simplified tape-tensioning arrangement which will maintain a constant force on the tape. In order to achieve this and other objects, in the present invention a constant-tension flexure spring is attached to the arm and the transport chassis so that the axis through the spring attachment points is essentially parallel to the path of tape travel.

BRIEF DESCRIPTION OF THE DRAWINGS

For a more complete understanding of the invention reference should be made to the drawings wherein.

The drawings are to be understood to be more or less of a diagrammatic character for the purposes of illustration. Like numerals identify the same elements in the several views.

DESCRIPTION OF PREFERRED EMBODIMENTS

Figure 1:
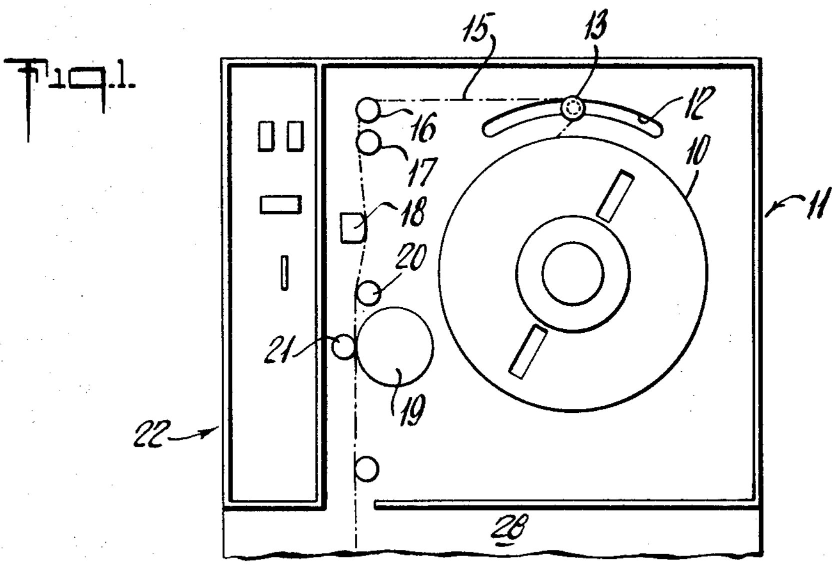
FIG. 1 is a front elevation of a tape transport constructed according to the present invention.

FIG. 1 shows one embodiment of a tape transport according to the instant invention. The drawing shows a supply reel 10, a cabinet 11, and an arcuate slot in the cabinet face located above the supply reel and spaced a short distance from the edge of the reel flange. A tension or drag roller 13 rides in the slot 12 and is attached to a pivot arm and associated apparatus which will be further discussed with reference to FIG. 2. A tape 15 passes over a guide roller 16, a guide post 17, and a transducing head 18. A roller 21 continuously urges the tape 15 against a capstan 19, which draws the tape past the head 18 under tension. A post 20 guides the tape in the vicinity of the head 18 and the capstan 19. In the arrangement shown in FIG. 1, the tape would ordinarily be fed into a bin 28 located below the cabinet and then later it would be rewound onto the reel from the bin. Panel 22 would typically house switches necessary to the operation and control of the unit.

Figure 2:
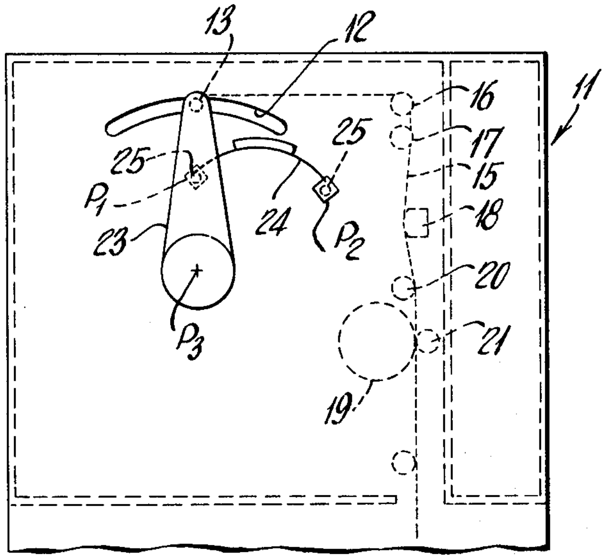
FIG. 2 is a rear elevation of the tape transport of FIG. 1.

FIG. 2 is a rear view of the transport shown in FIG. 1. A pivoted drag arm 23 carries roller 13. A flexure spring 24 is attached to the arm at a point P intermediate the ends of the arm. The spring is also connected to the chassis at a point $P_2$. Spring 24 is connected to the chassis and arm in such a manner that the ends can revolve as the spring ends are moved toward and away from each other. The spring, primarily because of the decrease of the acting moment arm as spring deflection increases, tends to apply a constant pushing force on the arm 23.

The constant-tension spring which is a part of this invention is known as a flexure spring and has as its distinguishing characteristic a helix with its axis offset with respect to the end supports. U.S. Pat. No. Re. 23,974 shows one type of spring which could be used in the present invention, although this particular construction need not be used.

Spring 24 is a closely wound helical compression spring with arms extending away from the helical body at either end and terminating in loops or hooks for mounting. The spring must be mounted so that it is always partially flexed. The axis through the helix should be well offset from the axis connecting the spring end connections so that the inside edge of the helix can act as a fulcrum as the spring ends are moved toward and away from each other.

Figure 3:
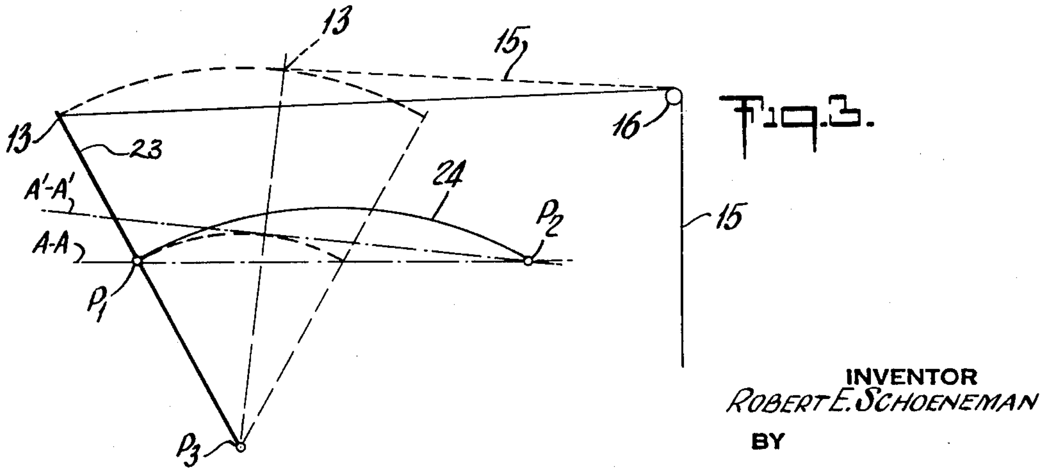
FIG. 3 is a schematic drawing similar to FIG. 2.

Referring now to FIG. 3, the point of connection $P_1$ of the spring to the drag arm is between the pivot point $P_3$ of the arm 23 and the roller 13. The other end of the spring is attached to the chassis so that an axis A—A drawn between the pivot points $P_1$ and $P_2$ of spring 24 is substantially parallel to the tape 15 between the roller guides 13 and 16 throughout the range of travel of arm 23. This arrangement provides that the application of the spring force will be always substantially parallel to the tape path of the tape 15 since the spring force is constant, the tape tension is constant through the travel of the arm 23. The spring force is applied along the same angle with respect to the drag arm as the pulling force of the tape with respect to the arm.

Although the present invention has been described with reference to specific embodiments, it will be appreciated by one skilled in the art that a variety of changes may be made without departing from the invention. For example, certain features may be used independently and equivalents may be substituted, all within the spirit and scope of the invention.

What I claim is:

1. In a magnetic tape transport, the combination comprising;
   - a chassis;
   - a tension arm and means for pivotally mounting said arm on said chassis;
   - a first tape guide mounted on said tension arm,
   - a second tape guide mounted on said chassis,
   - a constant-tension, closely wound helical spring having mounting arms extending from each end thereof,
   - means for attaching one of said mounting arms to said tension arm and the other of said mounting arms to said chassis at the points of attachment located so that said spring flexes throughout the travel of said arm and an axis drawn through said mounting points is substantially parallel to an axis drawn through said first and second tape guides throughout the travel of said arm.